A. M. WORD.
FERTILIZER DISTRIBUTER.
APPLICATION FILED OCT. 14, 1912.
1,067,775. Patented July 15, 1913.
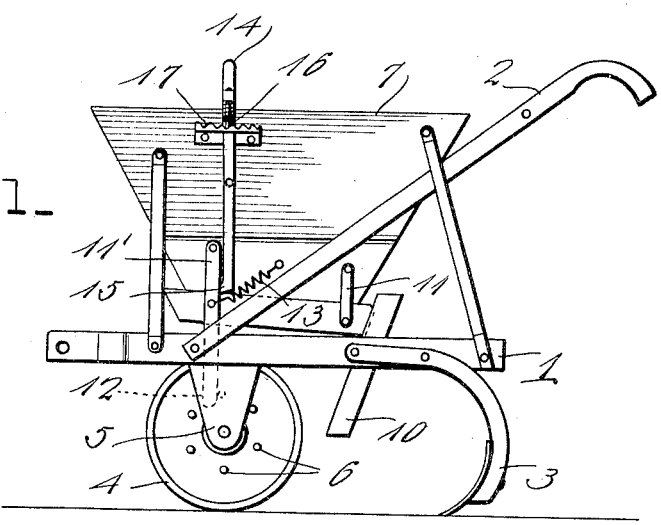
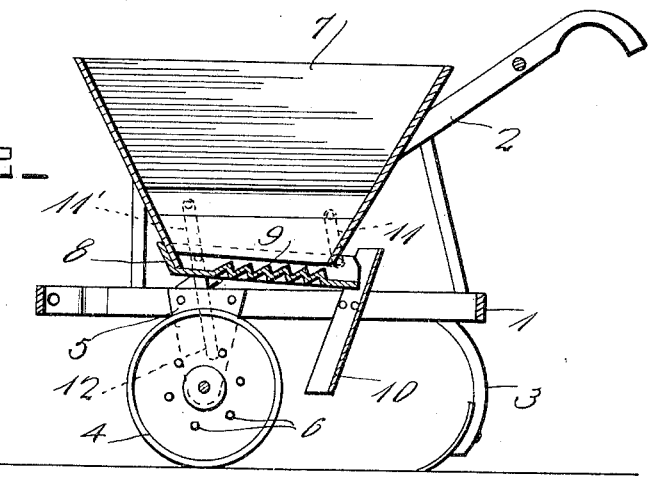
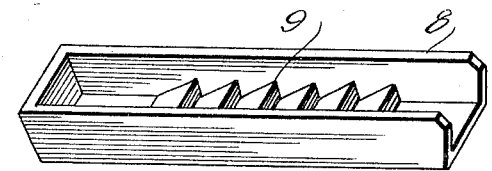

UNITED STATES PATENT OFFICE.

ARTHUR M. WORD, OF ROME, GEORGIA, ASSIGNOR TO TOWERS & SULLIVAN MANUFACTURING CO., OF ROME, GEORGIA.

FERTILIZER-DISTRIBUTER.

1,067,775. Specification of Letters Patent. Patented July 15, 1913.

Application filed October 14, 1912. Serial No. 725,682.

*To all whom it may concern:*

Be it known that I, ARTHUR M. WORD, a citizen of the United States, residing at Rome, in the county of Floyd and State of Georgia, have invented certain new and useful Improvements in Fertilizer-Distributers; and I do declare the following to be a full, clear, and exact description of the invention, such as will enable others skilled in the art to which it appertains to make and use the same.

This invention relates to fertilizer distributers.

The object of the invention is to provide a distributing mechanism by which a positive force feed for fertilizer, seed or other material is provided, any desired quantity of which may be fed.

With this and other objects in view, the invention consists of certain novel features of construction, and the combination and arrangement of parts as will be more fully described and claimed.

In the accompanying drawings; Figure 1 represents a side elevation of a fertilizer distributer constructed in accordance with this invention; Fig. 2 is a longitudinal vertical section thereof; Fig. 3 is a detail perspective view of the feeding trough or hopper bottom.

In the embodiment illustrated a suitable supporting frame 1 is shown provided with the usual handles 2 and covering plow 3. From this frame 1 a tappet wheel 4 depends, being revolubly mounted in suitable bearings 5 and adapted to travel on the ground whereby said wheel is turned during the passage of the apparatus over the field. This tappet wheel is provided with a plurality of laterally projecting studs 6 here shown arranged in an annular series and any desired number thereof being employed according to the quantity of material which it is desired to feed from the distributer. A hopper 7 for containing the fertilizer, seed or other material to be distributed, is fixedly mounted on the frame 1 and has an open lower end over which is arranged a horizontally reciprocating trough like bottom 8, said trough being open at its rear end and having rearwardly inclined transversely extending corrugations or feeding teeth 9 formed in the bottom thereof, said teeth being adapted to bite into the material contained in the hopper on the forward movement of the trough which is produced by means to be described and when said trough moves rearward discharges the material at the open rear end thereof into a discharge chute or conductor 10 which is fixed to the frame 1 and inclined downwardly and forwardly with its lower end disposed a suitable distance above the ground to place the fertilizer at the desired point without scattering. This trough 8 is pivotally connected with the hopper 6 by means of links 11 which are pivoted at one end to the sides of the hopper and at their other end to the sides of the trough as shown clearly in Figs. 1 and 2, whereby said trough is permitted to swing in a horizontal plane below the lower end of the hopper. The two front links 11' each have an extension 12 which projects into the path of the studs 6 on the tappet wheel 4 and each forms an actuating lever for the trough and is designed to be engaged by said studs on the turning of the wheel 4 to move the links or levers forward a certain distance, thereby imparting forward movement to the trough 8 and when said extensions 12 are released by the stud, a coiled spring 13 secured to each link 11' having an extension 12 and to the hopper, serve to retract the trough 8 moving it rearwardly and thereby forcing out the fertilizer carried by the teeth 9 at the rear end of the trough into the chute 10.

It will thus be obvious that as the fertilizer distributer is moved over the field the studs 6 on the tappet wheel are successively engaged with the lever extensions 12 and the trough 8 reciprocated back and forth over the lower end of the hopper, the studs moving it in one direction and the spring 13 in the other.

A lever 14 is fulcrumed intermediately of its ends on one side of the hopper 6 and has a foot 15 adapted to engage one actuating lever 11' and when moved forwardly a predetermined distance will force said lever out of the path of the studs or tappets on the wheel 4 and thus permit the wheel to be revolved without operating the distributing mechanism. This lever has a suitable spring pressed pawl or dog 16 adapted to engage a rack 17 for locking it in adjusted position as shown clearly in Fig. 1.

The stroke of the trough is regulated by the distance the tappets or studs 6 are arranged from each other, the closer together they are the shorter will be the stroke and the farther apart the greater.

The peculiar shape of the laterally extending corrugations or teeth forces the material to be distributed in one direction and thus feeds it out at the rear end of the trough into the chute 10 and the oscillation of the trough in a horizontal direction prevents the material from packing in the hopper. The reciprocation of the bottom or trough in a horizontal direction also provides a machine of very light draft as it is not necessary to agitate the entire supply of fertilizer in the hopper which of course would require much more energy than if the bottom portion only be agitated. The positive feed of the distributer adapts the machine to work successfully in any position, the same amount being fed out whether the machine is going up or down hill or inclined to either side.

While I have described my invention with more or less minuteness as regards details and as being embodied in certain precise forms, I do not desire to be limited thereto unduly any more than is pointed out in the claims. On the contrary, I contemplate all proper changes in form construction and arrangement, the omission of immaterial elements and substitution of equivalents as circumstances may suggest or render expedient.

I claim as my invention:

1. A fertilizer distributer comprising a supporting frame, a hopper mounted thereon and having an open lower end, a bottom mounted to reciprocate longitudinally below the open end of said hopper and having transversely extending rearwardly inclined outwardly facing feeding teeth substantially V-shaped in cross section, and means for reciprocating said bottom in a horizontal plane.

2. A fertilizer distributer comprising a supporting frame, a hopper supported by said frame and having an open lower end, a trough arranged below said hopper, links pivotally connected at one end to the sides of the hopper and at their other ends to the side of the trough, whereby said trough is adapted to swing in a horizontal plane below the lower end of the hopper, extensions on two of said links, and means for engaging said extensions at predetermined intervals for actuating the trough.

In testimony whereof I have hereunto set my hand in presence of two subscribing witnesses.

ARTHUR M. WORD.

Witnesses:
 J. B. SULLIVAN,
 H. A. DEAN.